LINEAR WIDE BAND DISCRIMINATOR

Filed July 12, 1967

INVENTOR.
JOSEPH J. BOYAJIAN
BY ROY MILLER
ATTORNEY.
GERALD F. BAKER
AGENT.

INVENTOR.
JOSEPH J. BOYAJIAN
BY ROY MILLER
ATTORNEY.
GERALD F. BAKER
AGENT.

United States Patent Office 3,546,609

Patented Dec. 8, 1970

3,546,609

LINEAR WIDE BAND DISCRIMINATOR

Joseph J. Boyajian, China Lake, Calif., assignor to the United States of America as represented by the Secretary of the Navy Filed July 12, 1967, Ser. No. 653,303
Int. Cl. H03d 3/26
U.S. Cl. 329—140 2 Claims

ABSTRACT OF THE DISCLOSURE

A frequency sensitive system, approaching 100% linearity, comprises two tuned circuits constructed so as to have linear attenuation bands of opposite polarity with identical attenuation rates over a specified frequency range.

The invention described herein may be manufactured and used by or for the Government of the United States of America for governmental purposes without the payment of any royalties thereon or therefor.

BACKGROUND OF THE INVENTION

In the transmission of information by means of frequency or phase modulation systems, it is necessary to use a device called a discriminator to assist in converting the modulated signal back to the original form. Devices similar to such discriminators have also been used for other purposes, such as in testing equipment or in a feedback circuit to secure more linear modulation in the transmitting equipment. In these devices distortion results when there is a non-linear variation in the output voltage or current with frequency variations of the input signal. There should at all times, within the bandpass of the input signal, be a linear relation of the output voltage or current to the input frequency.

Many attempts have been made to improve the sensitivity and range of discriminator devices and much work has been done in the specific area concerned with achievement of greater linearity of output voltage or current with respect to input frequency. Pats. No. 3,076,940 to Donovan C. Davis et al., and No. 3,281,701 to Joel H. Axe are exemplary of recent advances in discriminator design. However, the most any known system has disclosed, in the way of linearity, has been on the order of about 30% of the center frequency.

SUMMARY OF THE INVENTION

The present invention provides means and method which may be utilized to achieve a discriminator output of greater linearity resulting in a bandwidth closely approaching a value equal to 100% of the center frequency.

The disclosed discriminator, in a preferred form, comprises a low pass network made up of a series inductor and shunt capacitance and a high pass network consisting of a series capacitance (FIG. 2). The values of the attenuation slope of the frequency response characteristic of the low pass network are equal to that of the high pass network over the same frequency range. The differences between the outputs of the networks will then provide a discriminator output which is linear over a wide band of frequencies.

The novel features which are believed to be characteristic of the present invention, both as to its organization and method of operation, together with its further objects and advantages, will be more fully understood and appreciated from the following description considered in connection with the accompanying drawings.

THEORY OF DISCRIMINATOR DESIGN

Figure 1:
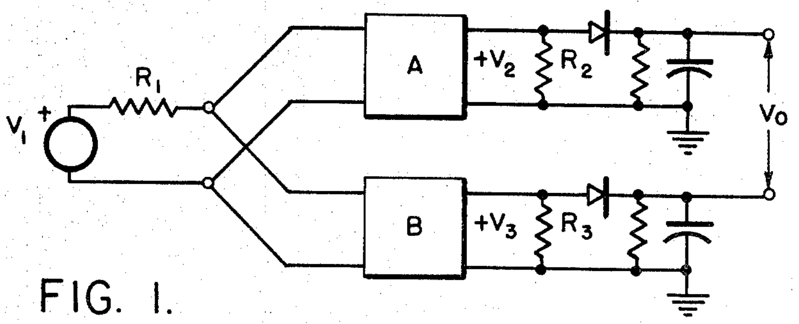
FIG. 1 is a schematic diagram of a typical frequency discriminator.

Given the network of FIG. 1 and assuming linear detector, the output voltage of the discriminator will be $$V_0=K(|V_2|-|V_3|) \qquad (1)$$

where $K$=the constant determined by diode characteristics. But we know that $$|V_2|=|V_1||N_1(j\omega)| \text{ and } |V_3|=|V_1||N_2(j\omega)| \qquad (2)$$

Substituting these identities (2) into Equation 1 we have $$V_0=K|V_1|(|N_1(j\omega)|-|N_2(j\omega)|) \qquad (3)$$

where $N_1(s)$=transfer function of the LP network.
$N_2(s)$=transfer function of the HP network.

Thus $V_0$ equals the difference between the magnitudes of the two transfer functions which in turn are functions of frequency.

Now at some particular center frequency, $\omega_0$, we want $V_0=0$ in order to have both negative and positive values of $V_0$. Or $$|N_1(j\omega)|\Big|_{\omega=\omega_0}=|N_2(j\omega)|\Big|_{\omega=\omega_0} \quad \text{from equation 3} \qquad (4)$$

In order that the discriminator output be linear over some frequency range, it is required that $$(|N_1(j\omega)|-|N_2(j\omega)|)\Big|_{\omega=\omega_1}=(|N_2(j\omega)|-|N_1(j\omega)|)\Big|_{\omega=\omega_2} \qquad (5)$$

where $\omega_2>\omega_0>\omega_1$, and $\omega_2-\omega_0=\omega_0-\omega_1$ or $\omega_2=2\omega_0-\omega_1$. Equation 5 tells us that $N_2(s)$ is not the high pass equivalent of $N_1(s)$. For example let $$N_1(s)=\frac{s+1}{2(s^2+2s+1)} \text{ and } N_2(s)=\frac{3(s+1)}{2(s^2+2s+1)}$$

or $$N_2(s)=s[N_1(s)]$$

then $$|N_1(j\omega)|-|N_2(j\omega)|=\frac{|\omega^2+1|(|1|-|\omega^2|)}{2|\omega^4+2\omega^2+1|}$$

but $$(|N_1(j\omega)|-|N_2(j\omega)|)\Big|_{\omega=\omega_1}=(|N_2(j\omega)|-|N_1)j\omega)|)\Big|_{\omega-\omega_2}$$

only when $\omega_2=1/\omega_2$ which does not satisfy the conditions of Equation 5. The reason for this nonlinearity is that while the attenuation rates (db/oct) of $N_1(s)$ and $N_2(s)$ are equal, the magnitude of $N_1(s)$ decreases by, say 6 db, from $\omega=1$ to $\omega=2$, while the magnitude of $N_2(s)$ decreases by, say 6 db, from $\omega=1$ to $\omega=1/2$ (i.e., the relationship between $N_1(s)$ and $N_2(s)$ is logarithmic). The solution here is to increase the stop band attenuation rate of $N_1(s)$ while keeping the attentuation rate of $N_2(s)$ the same (i.e., make the attenuation slopes equal). Thus $N_2(s)$ is no longer the high-pass equivalent of $N_2(s)$.

DESCRIPTION OF THE PREFERRED EMBODIMENT

Figure 2:
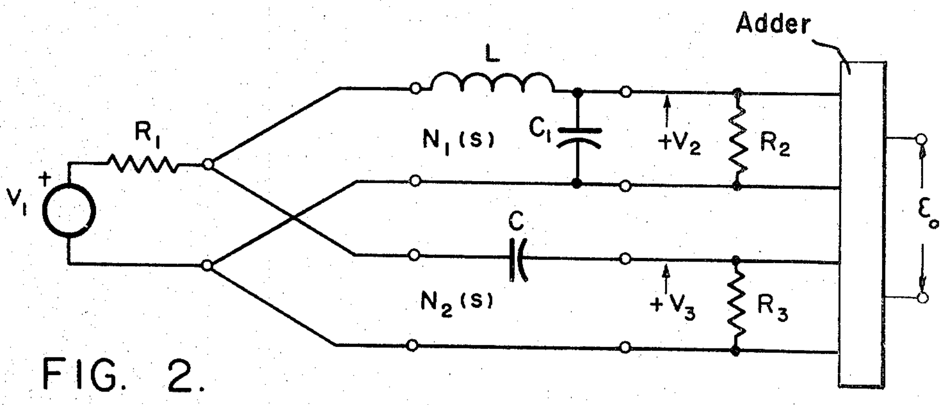
FIG. 2 is a schematic diagram of a discriminator network arrangement having a linear characteristic.

The network of FIG. 2 is the simplest network arrangement that will have a linear discriminator characteristic over a 100% bandwidth. Let $R_1=R_2=R_3=1$ ohm, then $$N_1(s)=\frac{SC+1}{2S^3LC_1C+S^2[2LC+C_1(L+C)]+S(3C+C_1+L)+2} \quad (6)$$

$$N_2(s)=\frac{S^3LC_1C+S^2LC+SC}{2S^3LC_1C+S^2[2LC+C_1(L+C)]+S(3C+C_1+L)+2} \quad (7)$$

Let $$D=2S^3LC_1C+S^2[2LC+C_1(L+C)]+S(3C+C_1+L)+2=a_3S^2+a_2S^2+a_1S+2$$

then $$|N_1(j\omega)|=\left(\frac{1+\omega^2C^2}{a_3^2\omega^6+\omega^4[a_2^2-2a_1a_3]+\omega^2[a_1^2-4a_2]+4}\right)^{1/2} \quad (8)$$

$$|N_2(j\omega)|=\left(\frac{\omega^2[\omega^4L^2C_1^2C^2+\omega^2(L^2C^2-2LC_1C^2)+2^2]}{a_3^2\omega^6+\omega^4[a_2^2-2a_1a_3]+\omega^2[a_1^2-4a_2]+4}\right)^{1/2} \quad (9)$$

Now substitute Equations 8 and 9 into Equation 4

$$1+\omega_0^2C^2=\omega_0^2[\omega_0^4L^2C_1^2C^2+\omega_0^2(L^2C^2-2LC_1C^2)+C^2] \quad (10)$$

or $$1=\omega_0^6L^2C_1^2C^2+\omega_0^4(L^2C^2-2LC_1C^2) \quad (11)$$

If we substitute Equations 8 and 9 into Equation 5 and pick $n$ different values of $\omega$, there will be $n/2$ equations. We have a total of $n/2+1$ equations and three unknowns, hence a solution does not necessarily exist. A method of solution is to program a computer to obtain the minimum error between the approximate and the desired response characteristics.

However, if we arbitrarily choose $C_1=.63$ and $$L=C=1.26,$$

Equations 8 and 9 become $$|N_1(j\omega)|=\left(\frac{1+1.59\omega^2}{4\omega^6+13.1\omega^2+4}\right)^{1/2} \quad (12)$$

$$|N_2(j\omega)|=\left(\frac{\omega^2(\omega^4+1.59)}{4\omega^6+13.1\omega^2+4}\right)^{1/2} \quad (13)$$

Substituting Equations 12 and 13 into Equation 5 and choosing $\omega_1=1/2$ and $\omega_2=3/2$, we have $$|N_1(j\omega)|-|N_2(j\omega)|\Big|_{\omega=1/2}=.199121$$

$$|N_2(j\omega)|-|N_1(j\omega)|\Big|_{\omega=3/2}=.194455$$

Thus, in this instance, we have a solution which has approximately a 1.5% error at the end points.

Figures 1A, 3:
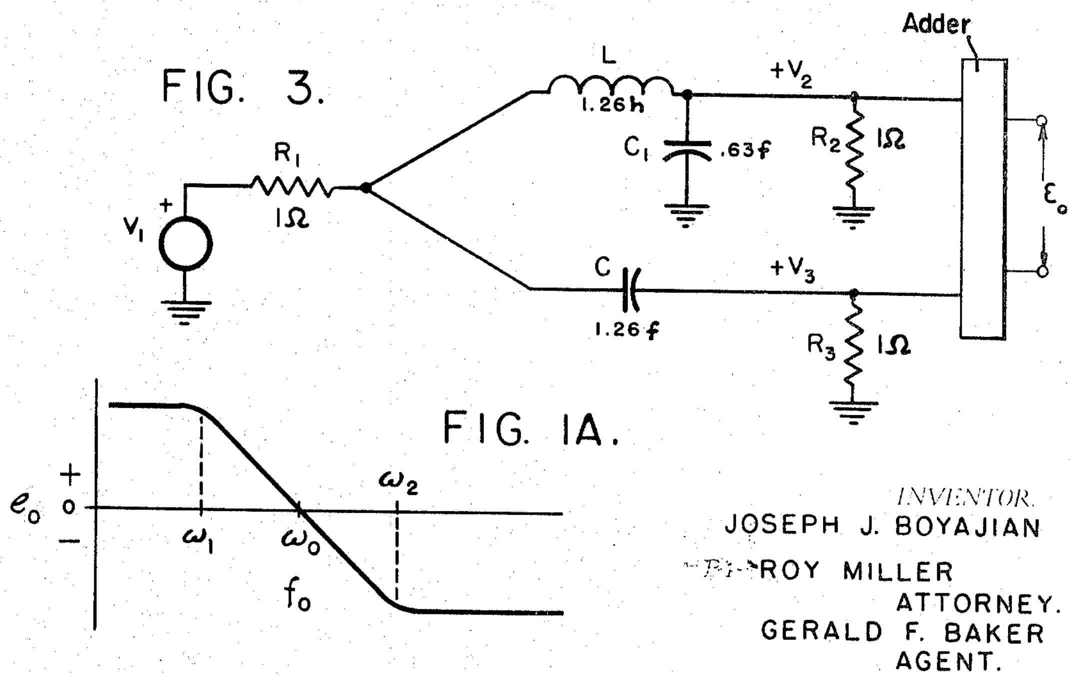
FIG. 1A is a graph of the output characteristic of the typical discriminator shown in FIG. 1.
FIG. 3 is a schematic diagram of an embodiment of the discriminator according to the invention.
Figure 4:
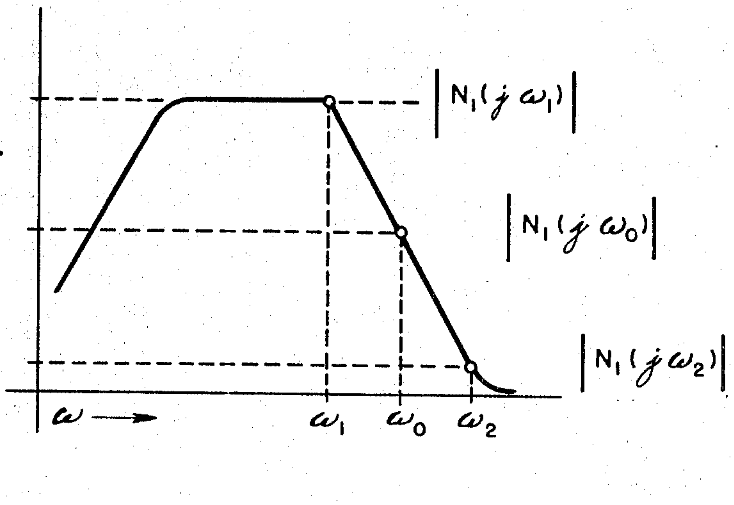
FIGS. 4 and 5 are waveshape diagrams helpful in explaining the underlying principles of the present invention.
Figure 5:
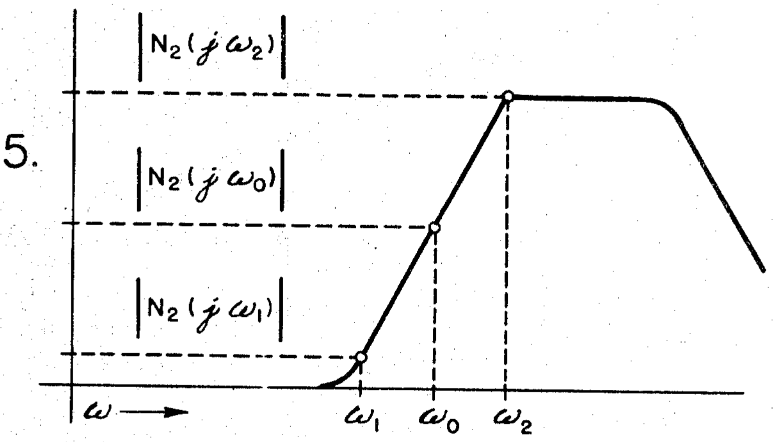
Figure 6:
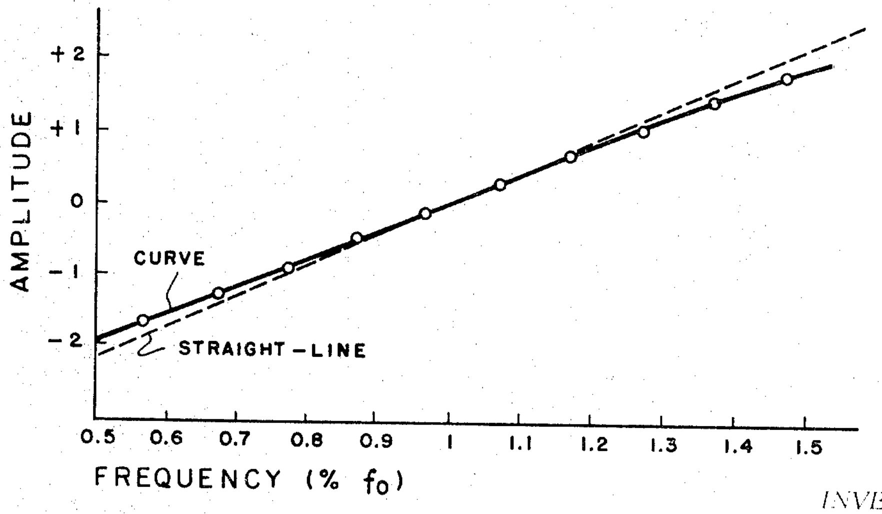
FIG. 6 is a graph showing the linear characteristic of the observed response values of practical embodiment of a discriminator according to the present invention.

In FIG. 6, output values empirically derived from an embodiment according to FIGS. 2 and 3 have been plotted in juxtaposition with a straight line to illustrate the proximity of the response curve to 100% linearity over the bandwidth.

CONCLUSION

From the foregoing it will be obvious that a method and means has been provided by which a discriminator may be constructed having a linear bandwidth equal to 100% of the center frequency. The element values given in FIG. 3 are normalized to a center frequency of one radian per second and to a load resistance of 1 ohm.

Obviously many modifications and variations of the present invention are possible in the light of the above teachings. It is, therefore, to be understood that the invention may be practiced otherwise than as specifically described.

What is claimed is:

1. A frequency sensitive filter system responsive to input signal frequency variations about a center frequency comprising:

first circuit means consisting of an inductance and capacitance combination having a first frequency pass band responsive to an input signal for producing a first output signal when the frequency of said input signal is within said first frequency pass band, wherein:

the output signal is of a given polarity and is substantially linear over the bandwidth of the first circuit and the attenuation rate of said first circuit means is a known constant;

second circuit means consisting of a capacitance means having a second frequency pass band responsive to said input signal for producing a second output signal when said frequency of said input signal is within said second frequency pass band wherein:

the output signal is of the polarity opposite that of the output signal of said first circuit means and is substantially linear over the bandwidth of the second circuit means and the attenuation rate of said second circuit means is the same as the attenuation rate of said first circuit means;

termination means connected in parallel with said first circuit means;

termination means connected in parallel with said second circuit means; and adding means for adding said first output signal and said second output signal to produce a summation signal; so that when said first and second circuit means are coincidentally driven by an input signal said summation signal is indicative of the frequency of the input signal as a function of the transmission characteristics of the two circuit means and said summation signal exhibits a linear relationship to the input frequency over a bandwidth approaching a value equal to 100% of said center frequency.

2. A frequency sensitive filter system according to claim 1 in which one of said first and second circuit means is a high-pass attenuation network; and the other of said first and second circuits is a low-pass attenuation network.

References Cited

UNITED STATES PATENTS 3,076,940 2/1963 Davis et al. -------- 329—140

OTHER REFERENCES

Jacobs: Abstract of Ser. No. 560,560, published Aug. 23, 1949, 625 Official Gazette 1108.

ROY LAKE, Primary Examiner

L. J. DAHL, Assistant Examiner

U.S. Cl. X.R.

329—143